US00RE39478E

(19) United States
(12) Reissued Patent
Hatch et al.

(10) Patent Number: US RE39,478 E
(45) **Date of Reissued Patent: *Jan. 23, 2007**

(54) MAGNETIC HEAD SUSPENSION ASSEMBLY FABRICATED WITH INTEGRAL LOAD BEAM AND FLEXURE

(75) Inventors: Michael R. Hatch, Mountain View, CA (US); Chak M. Leung, Palo Alto, CA (US)

(73) Assignee: Western Digital (Fremont), Inc., Fremont, CA (US)

( * ) Notice: This patent is subject to a terminal disclaimer.

(21) Appl. No.: 08/662,528

(22) Filed: Jun. 13, 1996

Related U.S. Patent Documents

Reissue of:
(64) Patent No.: 5,282,103
Issued: Jan. 25, 1994
Appl. No.: 08/042,906
Filed: Apr. 5, 1993

U.S. Applications:

(60) Division of application No. 08/521,786, filed on Aug. 31, 1995, now abandoned, which is a continuation-in-part of application No. 07/958,516, filed on Oct. 7, 1992, now abandoned.

(51) Int. Cl.
*G11B 5/48* (2006.01)

(52) U.S. Cl. ..... 360/245; 360/244.2; 360/244.3; 360/245.8; 360/245.5; 360/244.5

(58) Field of Classification Search ..... 360/245.5
See application file for complete search history.

(56) References Cited

U.S. PATENT DOCUMENTS

| | | | | | |
|---|---|---|---|---|---|
| 4,399,476 | A | | 8/1983 | King | |
| 4,853,811 | A | * | 8/1989 | Brooks, Jr. et al. | 360/103 |
| 5,065,271 | A | * | 11/1991 | Matsuura et al. | 360/104 |
| 5,138,507 | A | * | 8/1992 | Zarouri et al. | 360/104 |
| 5,187,625 | A | * | 2/1993 | Blaeser et al. | 360/104 |
| 5,237,472 | A | | 8/1993 | Morehouse et al. | |

FOREIGN PATENT DOCUMENTS

| | | |
|---|---|---|
| JP | 60-167172 | 8/1985 |
| JP | H6-28801 | 2/1994 |

* cited by examiner

*Primary Examiner*—Robert S. Tupper
(74) *Attorney, Agent, or Firm*—Burgess & Bereznak, LLP

(57) ABSTRACT

A magnetic head suspension assembly is fabricated with an integral piece which includes a load beam section, a flexure section, a rest mount section and a leaf spring section between the load beam and rear mount. A tongue extends from the load beam to the flexure and has a down-facing load dimple which contacts the non-air bearing surface of an attached air bearing slider. The flexure includes narrow thin legs adjacent to a cutout that delineates the load beam tongue. The head suspension is characterised by a high first bending mode frequency and low pitch and roll stiffness.

13 Claims, 6 Drawing Sheets

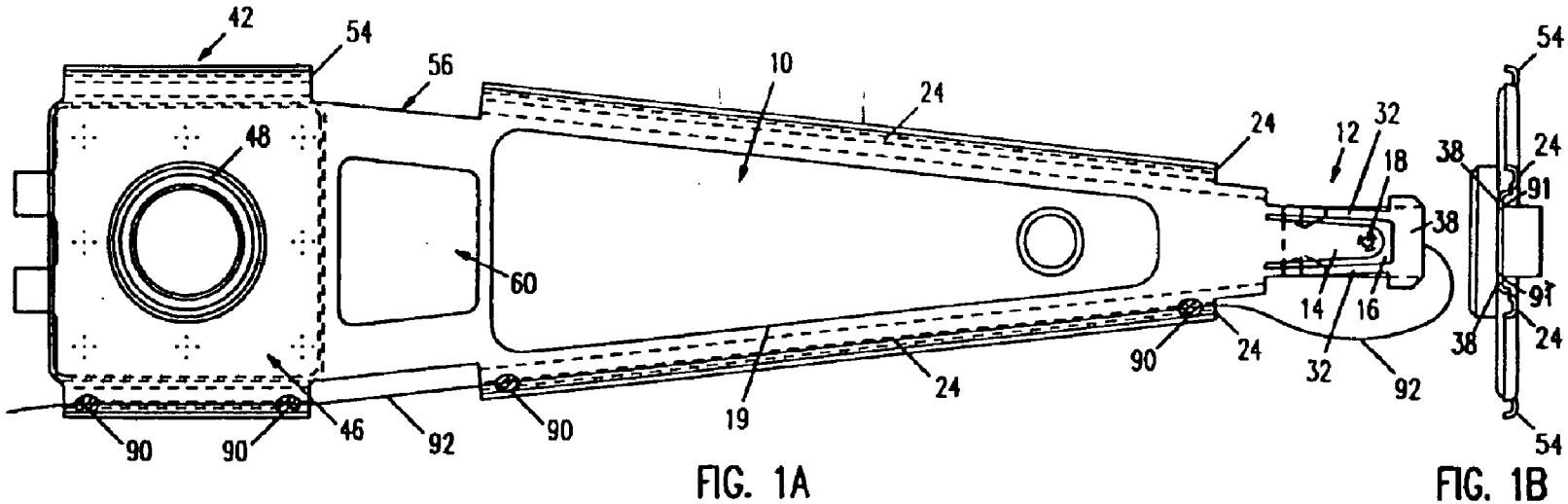
FIG. 1B
FIG. 1A
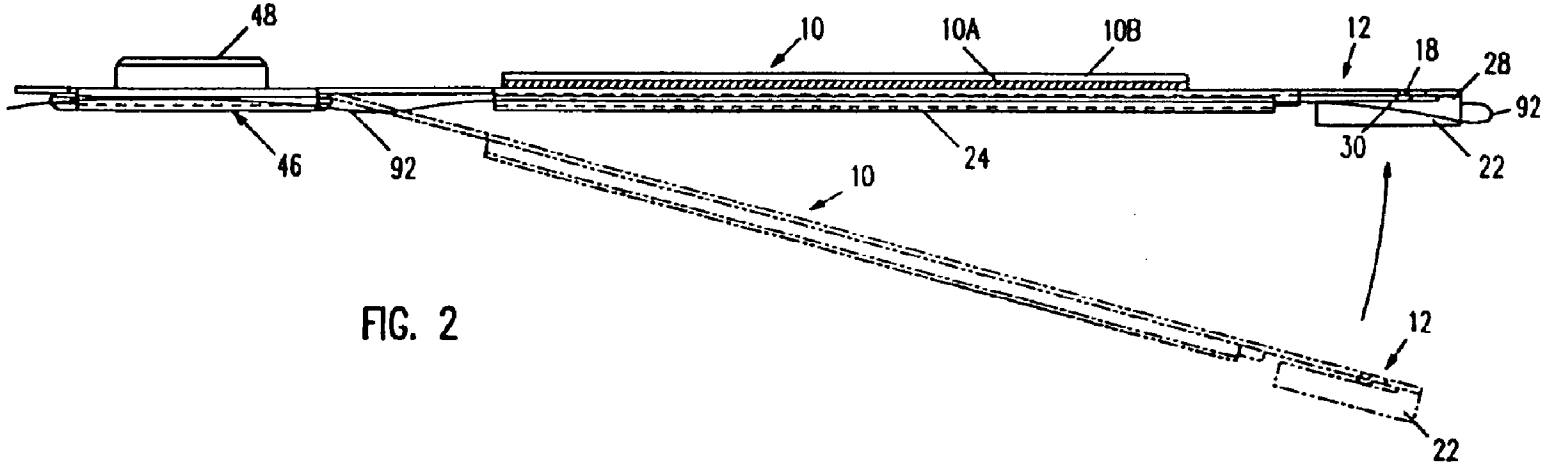
FIG. 2

MAGNETIC HEAD SUSPENSION ASSEMBLY FABRICATED WITH INTEGRAL LOAD BEAM AND FLEXURE

Matter enclosed in heavy brackets [ ] appears in the original patent but forms no part of this reissue specification; matter printed in italics indicates the additions made by reissue.

[This] *The present* application is a *divisional application of application No. 08/521,786 filed Aug. 31, 1995, which is a reissue of application No. 08/042,906 filed Apr. 5, 1993, which issued as U.S. Pat. No. 5,282,103 on Jan. 25, 1994, which is a* continuation-in-part of application Ser. No. 07/938,516, filed Oct. 7, 1992, now abandoned. *The present application is related to copending reissue application Nos. 08/662,531 and 08/662,885, both filed Jun. 13, 1996, and also to copending reissue application No. 10/631,993 filed Jul. 30, 2003.*

CROSS-REFERENCE TO COPENDING APPLICATION

[Copending] U.S. patent application Ser. No. 07/926,033 filed Aug. 5, 1992, *now U.S. Pat. No. 5,299,081 issued on Mar. 29, 1994*, is directed to a head suspension assembly particularly useful with nanosliders, which are about 50% of the size of the standard full size air bearing sliders. The present application [which is a continuation-in-part of copending application Ser. No. 07/958,516, now abandoned,] discloses a modified and improved head suspension assembly especially useful with femtosliders, which we about 25% of the size of the standard full size sliders. The subject matter of [the aforementioned copending application] *U.S. Pat. No. 5,299,081* is incorporated herein by reference.

FIELD OF THE INVENTION

This invention relates to a magnetic head suspension assembly that accommodates air bearing femtosliders which are used in compact disk drives.

DESCRIPTION OF THE PRIOR ART

Presently known disk drives, such as used in laptop or notebook computers, include at least one rotatable magnetic disk, at least one magnetic head assembly for transducing data recorded on the disk, and a rotary head actuator for transporting the magnetic head to selected data tracks on the routing disk. The magnetic head assembly comprises a head suspension fabricated with a rigid load beam element and a gimbaling flexure. A typical head suspension includes a load beam element and a flexure which are fabricated as separate parts and are then joined during assembly of the head suspension. Special tooling to implement accurate alignment and assembly of the load beam and flexure is required. After joinder of the load beam element and flexure, an air bearing slider is mounted at the end of the flexure. The slider supports a thin film magnetic transducer which coasts with the magnetic disk for recording or reading data signals.

During operation of the disk drive, the rotating magnetic disk provides an aerodynamic lift force to the slider, while an opposing gram load force is applied to the slider through the flexure. The resultant of the two opposing forces determines the flying height of the slider and its transducer relative to the disk surface. In its operating flying mode, the slider gimbals about *a* [load dimple] *protrusion, commonly known as a load dimple,* formed in the flexure.

In known prior art head suspension and flexure designs, the load force transfer and gimbaling action are separate to provide high first bending frequency with low pitch and low stiffness. The flexure participates slightly in the load transfer with the load beam while primarily providing the low pitch and roll stiffness gimbaling action and providing high stiffness for lateral motion. These suspensions are characterized by weak pitch, roll and bending stiffness when the head is flying over the disk surface. For optimum functioning, however, the suspension structure should provide a high first bending mode resonant frequency so that the slider can follow variations in the topography of the routing disk surface while providing low pitch and roll stiffness.

Another objective in the design of compact disk drives which are used in laptop or notebook computers is to minimize the size and mass of the drive components. A reduction in Z-height (vertical height) of the suspension and slider assembly results in a corresponding reduction in the Z-height of the compact disk drive incorporating the assembly. A standard full size slider is about 0.160 inch long, 0.125 inch wide and 0.0345 inch high. Presently known disk drives employ nanosliders that measure approximately 0.080 inch long, 0.063 inch wide and 0.017 inch high, which size is about 50% of the size of a standard slider. The novel suspension and slider design disclosed herein is particularly useful for femtosliders, which measure about 0.040 inch long, 0.020–0.026 inch wide and 0.0110 inch in overall height, which size is about 25% of the size of a standard full size slider. It should be understood that the novel design may be used with other size sliders as well.

SUMMARY OF THE INVENTION

An object of this invention is to provide a head suspension and slider assembly having significantly reduced Z-height.

Another object of this invention is to provide a head suspension assembly characterized by low pitch and roll stiffness.

Another object is to provide a head suspension assembly characterized by low bending stiffness with decreased gram load tolerance effects.

Another object is to provide a head suspension assembly characterized by a relatively high first bending mode, first torsion mode, and first lateral mode resonant frequencies.

A further object is to provide a head suspension design that affords significant savings and advantages in manufacture and mass production.

According to this invention, a magnetic head suspension assembly is formed from an integral planar piece comprising a load beam section and flexure section. The load beam is configured preferably as a truncated conical section having flanges along its sides and an extending tongue at its narrow end. The side flanges are formed with U-shaped channels and provide rigidity and stiffness to the load beam section. The load beam tongue extends [into the flexure section and is formed with a hemispherical load dimple which faces down to the non-air bearing surface of a head slider. A U-shaped cutout portion that is formed in the flexure section adjacent to the load beam tongue delineates the shape of the tongue. In one embodiment of the invention, the flexure section includes two narrow etched legs that extend from the load beam and are disposed adjacent to the cutout portion. The narrow legs are connected by a lateral ear at the end of the flexure.] *from the narrow end of the load beam section into a shaped opening of the flexure section. The load beam tongue is formed with a load supporting protrusion or dimple that extends downward to contact a non-air bearing surface of a head slider. The shaped opening defines two flexure beams that extend in a longitudinal direction of the*

*load beam. The flexure beams are connected by a transverse section at the end of the flexure section opposite the narrow end of the load beam section.* In this implementation, the head slider is bonded to the bottom surface of the [lateral ear] *transverse section*. In an alternative embodiment, the flexure section includes outriggers configured as a split tongue to which the slider is bonded.

BRIEF DESCRIPTION OF THE DRAWINGS

The invention will be described in greater detail with reference to the drawings in which:

FIG. 1A is a top plan view of a head suspension and slider assembly, made in accordance with this invention;

FIG. 1B is a from elevational view of the head suspension of FIG. 1;

FIG. 2 is a side elevation view of the assembly of FIG. 1, showing a head slider attached to the end of the flexure, in a loaded position and in phantom in an unloaded position;

FIG. 13 is a top plan view of a femtoslider suspension, partly broken away, including load/unload side tabs;

FIG. 13A is a section A—A taken through FIG. 13;

FIG. 14A is a top view of the flexure of the suspension, partly broken away, showing a stepped flexure;

FIG. 14B is a side view of the flexure of FIG. 14A;

FIG. 14C is a front view of the flexure of FIG. 14A.

Similar numerals refer to similar elements in the drawing.

DESCRIPTION OF THE PREFERRED EMBODIMENT

Figure 3:
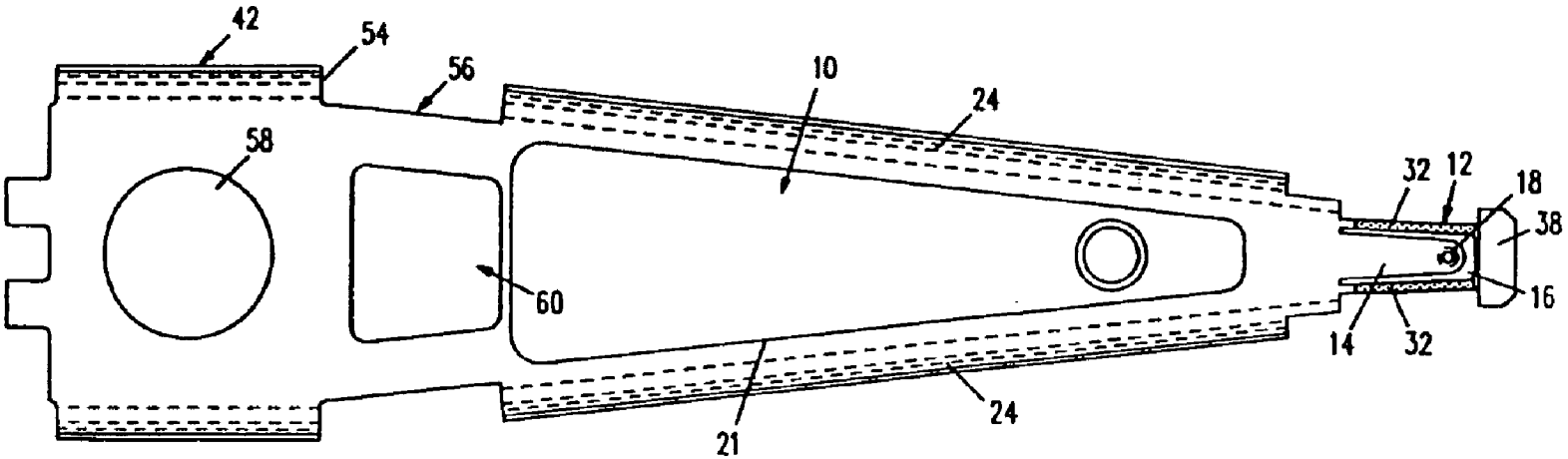
FIG. 3 is a bottom view of the head suspension of FIG. 1.
Figure 4:
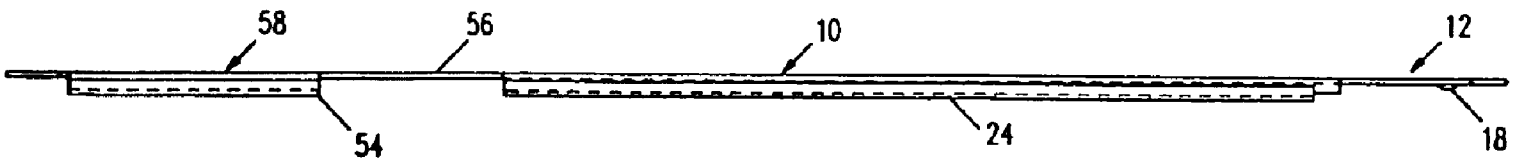
FIG. 4 is a side elevation view of the assembly of FIG. 3, showing the load dimple without an attached slider.
Figure 5B:
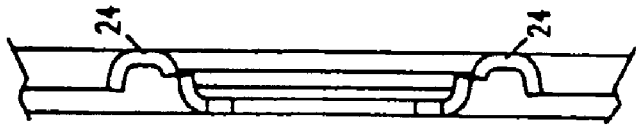
FIG. 5B is a front elevation view of the head suspension of FIG. 5A.
Figure 5A:
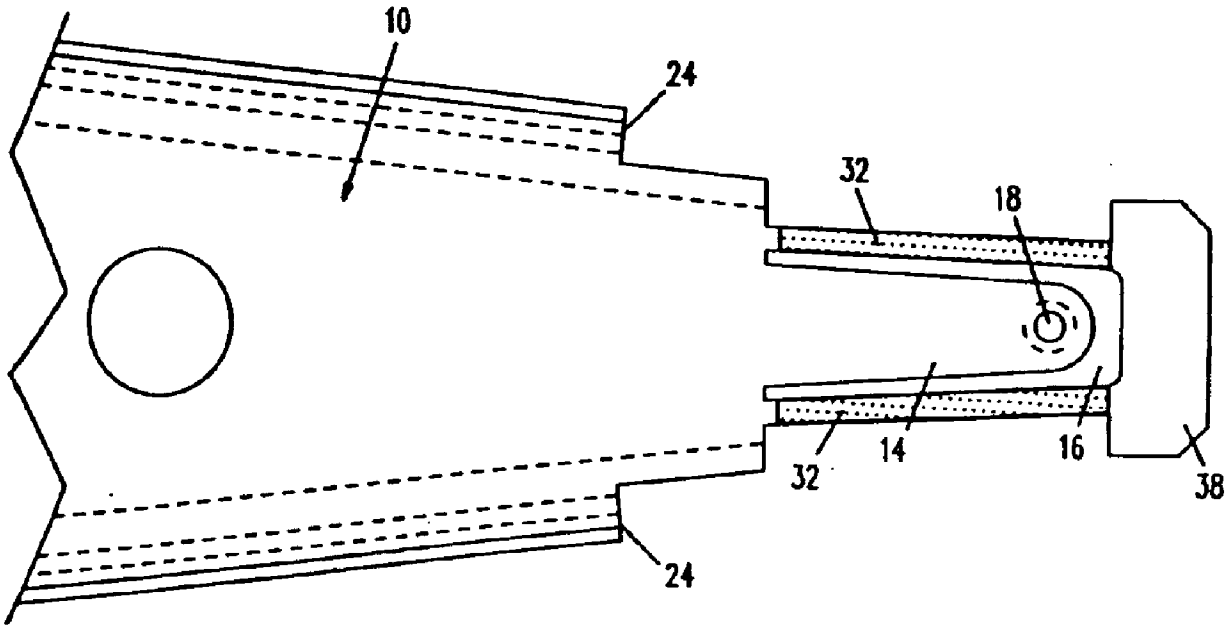
FIG. 5A is an enlarged view of a portion of the head suspension of FIG. 3.

With reference to FIGS. 1A–5B, a magnetic head suspension assembly includes a load beam section 10, a flexure section 12, a leaf spring section 56 and a rear mount section 42. The suspension is formed from an integral flat piece of nonmagnetic material, preferably a 300 Series type stainless steel having a thickness of about 0.0012 to 0.0013 inch. As a result of using an integral piece, the load beam section 10 and flexure section 12, as well as the leaf spring section 56 and rear mount section 42, are disposed substantially in a single plane. No separate forming of individual load beam and flexure parts is required. Therefore, no assembly steps of joining and welding are needed for attaching the flexure to the load beam.

The load beam section 10 is preferably made in a truncated conical or triangular shape. The load beam section has a short tapered tongue 14 extending from [its relatively narrow end into the flexure section 12. The tongue 14 is delineated by a U-shaped cutout 16 in the flexure section. ] *the relatively narrow end of the load beam section into a shaped opening 16 of flexure section 12. The tongue 14 delineates the U-shape of the opening 16.* The load beam tongue 14 provides low deflections in the direction orthogonal to the plane of the load beam section and flexure section by virtue of its short length and low gram load force.

A constrained layer damping element 19 made of elastomer 10A about 0.002 inch thick and an overlay 10B of about 0.002 inch thick stainless steel is laid down on the top surface of the major section of the load beam to minimize undesirable resonances of the suspension, as shown in FIG. 1. Alternatively, a similar damping element 21 may be deposited on the bottom surface of the load beam without interfering with the flexure 12, as shown in FIG. 3.

The flexure section 12 includes [narrow legs 32 that are located adjacent to the sides of the U-shaped cutout 16. The flexure legs 32] *flexure beams 32 defined by shaped opening 16. The flexure beams 32* are chemically etched to a thickness of about 0.0010 inch for increased flexibility. The *flexure beams 32 are narrow,* [narrow legs 32 are ] thin and relatively weak to allow the desired gimbaling action about the load dimple 13 and also to allow the suspension to have low roll and pitch stillness. A lateral connecting part or [ear 38] *transverse section 38* is formed with the integral flat load beam and flexure to connect ends of the [narrow legs 32.] *flexure beams 32.*

In this implementation of the invention, a slider 22 is bonded to the lateral connecting part 38. A hemispherical load dimple 18 is formed on the load beam tongue 14 and is in contact with the top non-air bearing surface of an air bearing slider 22 that is bonded to the lateral part or [ear 38.] *transverse section 38.* The load dimple 18 is formed so that the hemisphere of the dimple faces down to the slider. The dimple 18 may be offset, 0–0.006 inch for example, from the centerline of the slider in order to control flying height characteristics.

U-shaped flanges 24 extend along the sides of the load beam section and are truncated before reaching the flexure section 12. The flanges 24 contribute to the stillness of the load beam section and localizes the bending action to the spring section 56, thereby minimizing the pitch attitude changes due to arm/disk vertical tolerances. Head circuitry wiring 92 without the conventional tubing is located within the channels of the flanges 24. The absence of tubing allows the U-shaped channels of the flanges 24 to be relatively shallow thereby contributing to the reduction of the Z-height of the head suspension assembly. Adhesive material 90 is used to maintain the wiring 92 fixed in place. Adhesive fillets 91 are provided adjacent to the [ear 38] *transverse section 38* and the slider 22. The fillets 91 are exposed and thus can be cured easily by application of ultraviolet radiation.

In a disk drive using this hand suspension and slider assembly, flexing occurs between the load beam tongue 14 and the flexure legs 32. With this design, the load force is transferred through the tongue 14 to the truncated conical section of the load beam. This integral load beam/flexure configuration allows the separation of the applied load transfer force from the gimbal action so that the structure may be made stiff at the load beam for proper bending and relatively weak about the load dimple to allow proper pitch and roll of the slider.

A feature of the head suspension and slider assembly disclosed herein is that the slider 22 is configured with a step 28, which is formed by cutting a recessed portion or platform 30 on the non-air bearing top surface of the slider 22. The Z-height of the step 28 is substantially the same as the Z-height of the hemispherical load dimple 18. Sufficient spacing is provided between the load beam tongue 14 and the top slider surface to allow free gimbaling action of the slider 22 with no interference from the load beam. The slider step 28 is sufficiently high so that the slider end at the trailing edge can accommodate a thin film magnetic transducer including its coil turns.

The leaf spring 56 between the load beam section 10 and the rear mount section 42 is formed with a trapezoidal-like [cutout] *opening* 60 to provide flexibility. The flexible section 56 is formed to provide a desired load force that counteracts the aerodynamic lift force generated by the rotating disk during operation of the disk drive. The load force arises from bending the suspension from the phantom position, shown in FIG. 2, to the raised position as indicated by the arrow.

The rear mount section 42 of the load beam 10 bas a hole 48 to allow connection of a swage plate 46 to the suspension by means or a boss 48 and by laser welding. The swage plate 46 provides stiffness to the rear mount section 42. Rear flanges 54 provide wire routing channels to protect the wires during handling.

The head suspension and slider assembly described herein incorporates a stiff load beam and a relatively long and narrow flexure which includes thin weak flexure legs and connecting lateral part. With this design, low bending stiffness and high lateral and longitudinal stiffness with low roll and pitch stiffness are realized. The load beam tongue has a high vertical or perpendicular stiffness so that there is minimal bending of the load beam tongue up or down relative to the plane of the suspension. The first bending mode resonant frequency or vibration is substantially higher than known prior art suspension designs of comparable size.

In an actual implementation of this invention, the overall height of the slider is about 0.0110 inch, its length about 0.0400 inch, and its width about 0.020 inch. The height of the step 28 is about 0.0015 inch above the recessed portion 30 which is 0.0336 inch long. The surface area or the top of the step 28 it preferably minimized in size to reduce the effects of bending or warping at the surface of the slider step which may occur due to the difference in the thermal coefficients of expansion of the ceramic slider 22 and the stainless steel [ear 38.] *transverse section 38.* Such bending would affect the flying characteristics of the head adversely.

Figure 6C:
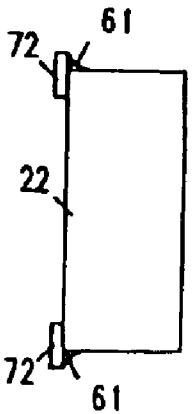
FIG. 6C is a representational front view showing the overhang of the outriggers of FIG. 6A relative to a slider.
Figure 6B:
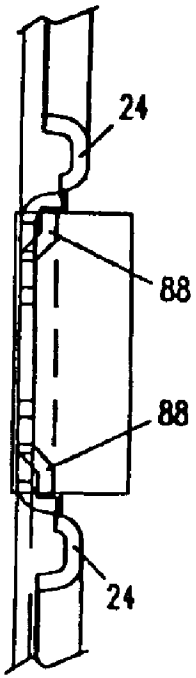
FIG. 6B is a front elevation view of the head suspension portion of FIG. 6A.
Figure 6A:
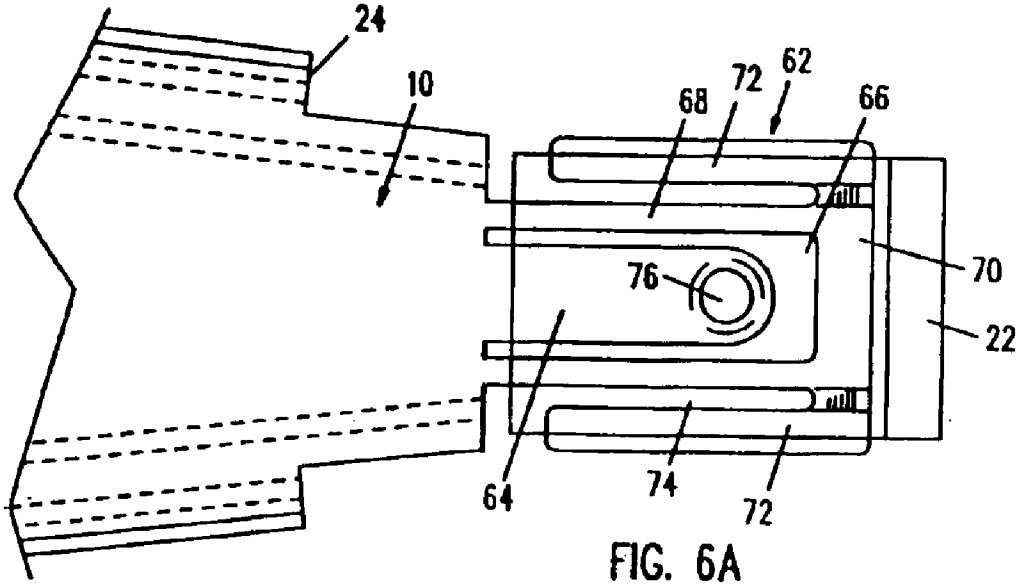
FIG. 6A is an enlarged view of a portion of a head suspension and flexure incorporating an alternative design.
Figure 7:
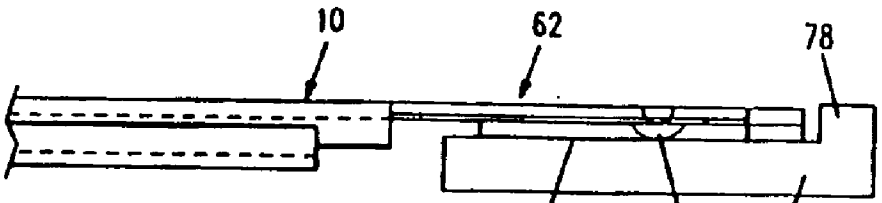
FIG. 7 is a side elevation view of a portion of the head suspension shown in FIG. 6A.

In an alternative embodiment of the head suspension, illustrated in part in FIGS. 6A–7, the flexure section 62 is formed with a tongue 64 and a [cutout 66. ] *shaped opening 66.* A down-facing load dimple 76 is provided on the tongue 64. [Narrow etched legs 68] *Narrow, thinly etched flexure beams 68* that extend from the load beam 10 are connected by a transverse part 70. The [legs 68] *flexure beams 68* are chemically etched to be thinner than the integral flat piece used to form the load beam and flexure sections. Outriggers 72 forming a split tongue are provided at the sides of the flexure 62 and are separated from the thin [legs 68 by cutouts 74.] *flexure beams 68 by spaces 74.* The outriggers 72 overhang the sides of the slider 22 and the slider is fastened to the outriggers by [an adhesive fillet 90.] *adhesive fillets 61.* In this implementation, the top non-air bearing surface 20 of the slider 22 is bonded to the outriggers 72 by adhesive fillets [which provide bond strength at the cutout 16.] *61 which provide bond strength* as shown in FIG. 6C. The slider 22 is mounted to the outriggers 72 so that the center of the slider is aligned with the load dimple 76, and the slider projects beyond the end of the transverse part 70. There is no offset of the load dimple 76 relative to the centerline of the slider. With this implementation, a lower vertical height (Z-height) is realized. Also the slider bonding areas of the outriggers 72 are larger than the bonding area of the lateral connecting part 38 of flexure 12 of FIG. 1. In this implementation, there is little room to move the slider toward the leading edge relative to the load dimple, which may be necessary to obtain optimal flying attitude. Also, additional forming is required in order to bend the two outrigger legs 72 down to the bend 20, which increases the tolerance during production.

Figure 8:
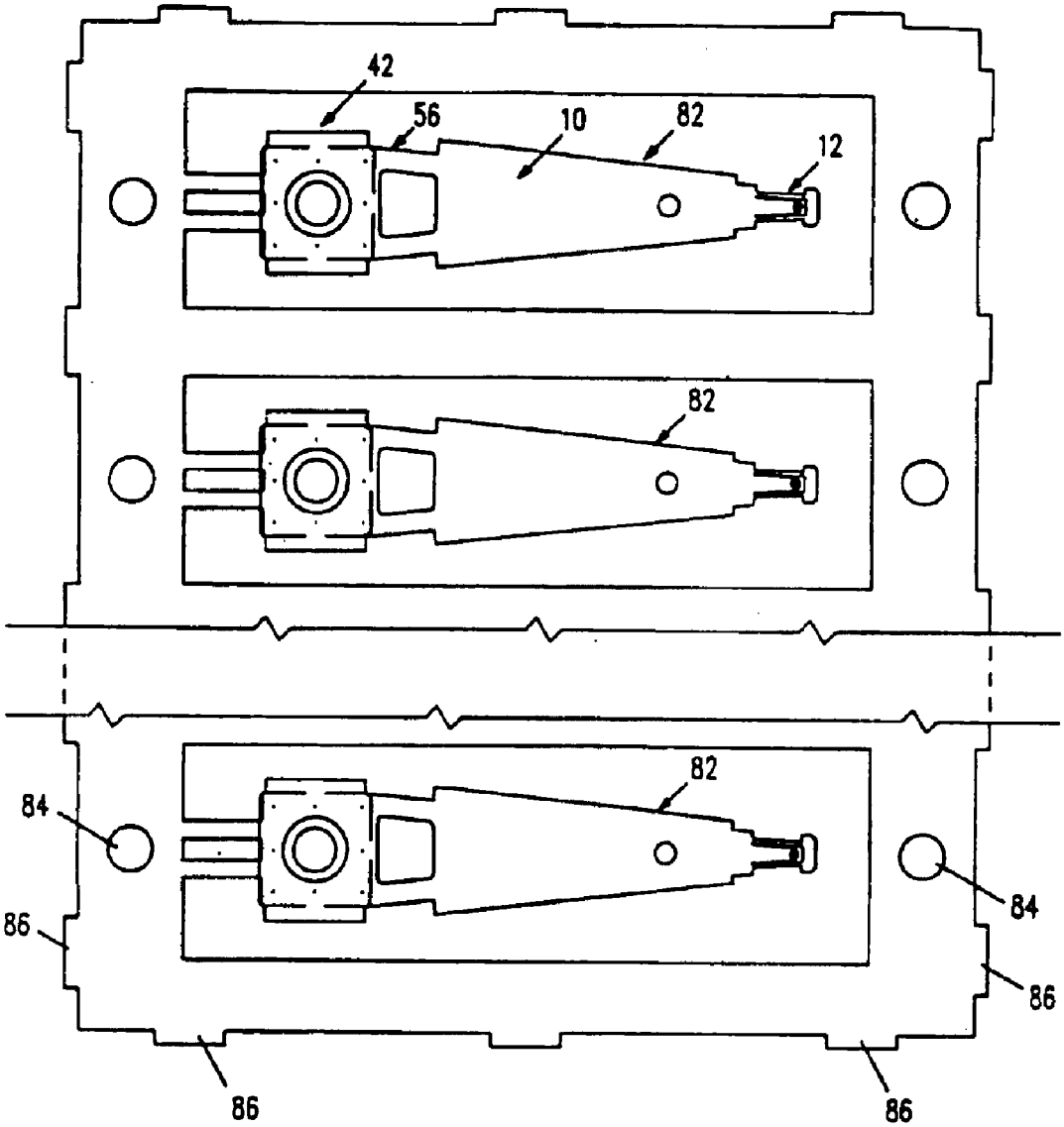
FIG. 8 is a plan sectional representation of a paddle board or fret illustrating three of a multiplicity of head suspension bodies stamped from a piece of stainless steel.
Figure 8A:
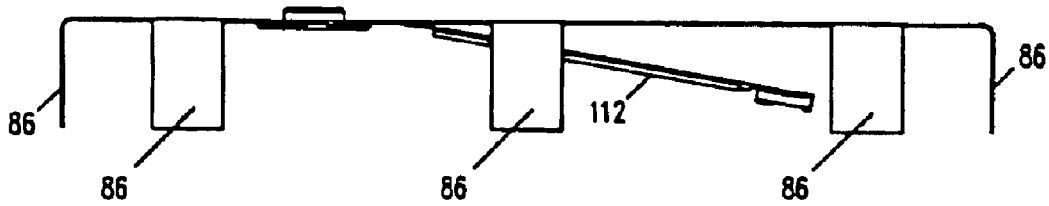
FIG. 8A is a side elevation view of the paddle board of FIG. 8.

FIG. 8 shows a paddleboard or fret 80 formed from a stainless steel piece that has been stamped with a number of head suspensions 82, each of which was formed with the design shown in FIG. 1. Tooling holes 84 and support legs 86 are provided for further handling. FIG. 8A shows the paddleboard 80 with support legs 86 bent to enable working on the extremely small femtoslider suspensions.

Figure 9:
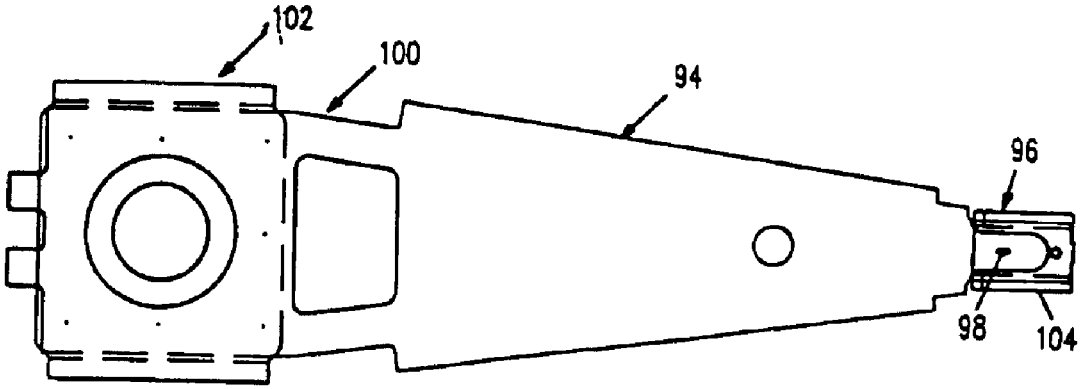
FIG. 9 is a top plan view of a nanoslider suspension, such as disclosed in the aforementioned copending application.

FIG. 9 shows a nanoslider suspension such as disclosed in copending application Ser. No. 07/926,033. The nanoslider includes a load beam 94, flexure 96, load beam tongue 98, spring section 100, rear mount section 102 and slider 104.

Figure 10:
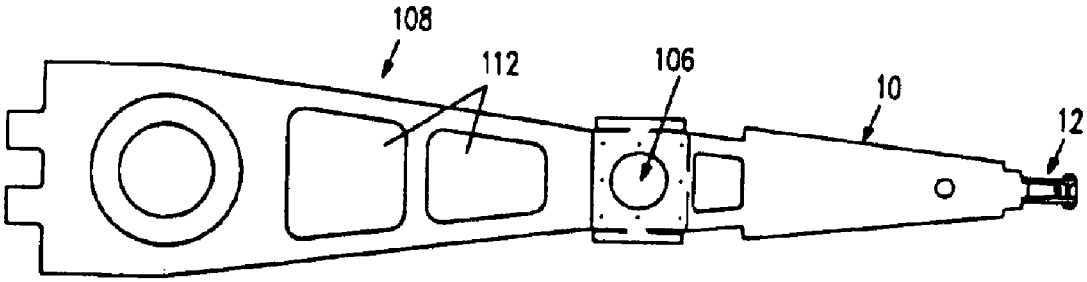
FIG. 10 is a top plan view of a femtoslider suspension, with an extended part to enable handling during production.
Figure 11:
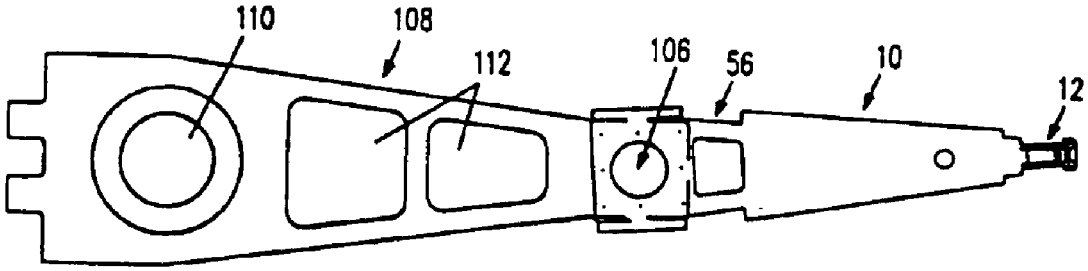
FIG. 11 is a top plan view of the femtoslider suspension of FIG. 10 with a skewed configuration relative to the extension.

FIGS. 10 and 11 illustrate the femtoslider suspension of this invention with the load beam 10, flexure 12, spring section 56 and a rear section having a tooling hole 106. The tooling hole section 106 is attached to an extension 108 formed with an apertured swage 110 that allows attachment to a rotary actuator. In effect for extremely small drives, such as 1.3 inch and smaller, the extension 108 serves as an arm pivot and precludes the need for a separate arm structure, as used in the prior art. The extension 108 also allows the assembly to match the overall length of other industry standard "70%" microslider suspensions, thereby making it easy to use existing tooling.

FIG. 11 shows the suspension skewed with relation to the extension 108 to compensate for skew experienced as the head moves between the outer diameter and the inner diameter of the disk during accessing. The extension may include apertures 112 for weight reduction, as shown in FIGS 10 and 11. The apertures 112 serve to adjust for resonant conditions and/or to adjust for total actuator balance about the pivot.

Figure 12:
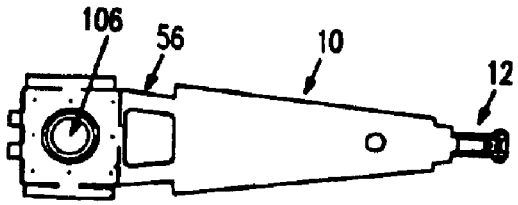
FIG. 12 shows the femtoslider suspension without the extension for the purpose of illustrating the relative sizes or the nanoslider suspension and the femtoslider suspension.

FIG. 12 illustrates the femtoslider suspension without the extension and shows the large difference size between the nanoslider and femtoslider suspensions. In an implementation of the femtoslider, the length was about 0.395 inch and the greatest width was about 0.056 inch.

With reference to FIGS. 13 and 13A, a head slider suspension includes flat side tabs 120 which protrude to enable loading and unloading of the head suspension assembly relative to the surface of a magnetic disk in a disk drive. The side tabs may be present on one or both sides of the load beam. The side tabs 120 are moved by means of a tool for lifting or lowering the suspension assembly. The addition of the flat side tabs which are in the same plane as the load beam does not add to the vertical Z-height of the suspension assembly.

FIGS. 14A–C depict a partial suspension assembly having a slider 122 and a thin film transducer 124 at a slider end. The slider 222 has a flat top surface 126 on which the load dimple 76 is seated. The slider 122 is not formed with a step 78, as shown in the slider design of FIG. 7. The flat surface 124 extends across the entire top of the slider. However, the front end of the flexure 128 is bent at section 130 and 132, as shown in FIG. 14B to allow the flexure to come down by a distance substantially equivalent to the height of the load dimple 76. In this way, the flexure 128 contacts the flat top surface 126 of the slider 122. The slider is bonded to the bent sections 130 and 132 by adhesive fillets 134 and 136. The flat contact surfaces of flexure 128 and flat surface 125 at the top of the slider are also bonded together by adhesive. By using a flat surface slider, the slider requires less machining, thus realizing a savings in time and labor costs as sell as a reduction in possible breakage and error during production.

By virtue of this invention, a single integral piece is formed with a load beam and flexure, thereby realizing a significant savings in material and labor. Alignment of the load beam and flexure and welding of the separate parts are eliminated. Certain critical tolerances that were required in former load beam/flexure assemblies are no longer needed thereby enhancing the assembly process. The design allows the separation of the load transfer function from the gimbaling action which eliminates the weak bending characteristic found with prior art suspensions. It should be understood that the parameters, dimensions and materials, among other things, may be modified within the scope of the invention. For example, the slider design with the step and platform configuration disclosed herein can be used with a "50" nanoslider suspension or other size suspensions.

What is claimed is:

[1. A magnetic head suspension assembly including an air bearing slider and at least one transducer disposed on said slider for transducing data that is recorded and read out from a surface of a rotating magnetic disk drive comprising:

a single integral planar piece of a specified thickness comprising, a load beam section formed with a narrowed end;

a flexure section formed with two spaced narrow legs defining a cutout portion therebetween, said legs extending from said narrowed end of said load beam section, and a lateral ear spaced from said load beam section connecting said legs;

a tongue extending from said end of said narrowed load beam section, said tongue being disposed between said legs of said flexure section, said tongue having a free end within said flexure section, said tongue being formed with a load dimple;

said air bearing slider being bonded to said lateral ear and in contact with said load dimple;

whereby load transfer is effectively separated from the gimballing action of said slider so that pitch and roll stiffness is effectively reduced.]

[2. An assembly as in claim 1, wherein said head slider has a top non-air bearing surface attached to said flexure section.]

[3. An assembly as in claim 2, including means formed with said lateral ear for supporting said attached head slider.]

[4. An assembly as in claim 3, wherein said supporting means comprises outriggers or a split tongue.]

[5. An assembly as in claim 3, wherein said supporting means comprises said lateral ear that connects said narrow legs.]

[6. An assembly as in claim 2, wherein said slider is about 0.0110 inch high, 0.0400 inch long and 0.0200–0.0260 inch wide.]

[7. An assembly as in claim 2, wherein said top non-air bearing surface of said slider is formed with a platform and step adjacent to said platform.]

[8. An assembly as in claim 7, wherein said platform of said slider is about 0.0336 inch long and said step is about 0.0015 inch high.]

[9. An assembly as in claim 2, including a load dimple formed in said tongue.]

[10. An assembly as in claim 9, wherein said load dimple is hemispherical in shape and faces down into contact with said top surface of said slider.]

[11. An assembly as in claim 1, wherein said single integral planner piece including said tongue is about 0.0012 to 0.0015 inch thick and said narrow legs are about 0.0010 inch thick.]

[12. An assembly as in claim 1, wherein said load beam section is shaped as a truncated triangle.]

[13. An assembly as in claim 1, including a mount section at the rear end of said load beam section for enabling mounting said suspension to an actuator arm; and a leaf spring section between said rear mount section and said load beam section for providing flexibility to said suspension.]

[14. An assembly as in claim 13, including a swage plate joined to said mount section for providing rigidity to said rear end of said suspension assembly.]

[15. An assembly as in claim 13, including front flanges formed along the edges of said load beam section and rear flanges formed along the edges of said rear mount section with a hiatus between said front and rear flanges.]

[16. An assembly as in claim 15, wherein said front flanges are formed with shallow U-shaped channels, and electrical wiring without tubing is positioned within said channels.]

[17. An assembly as in claim 13, including a cutout in said leaf spring section for providing flexibility to said suspension.]

[18. An assembly as in claim 1, further including an apertured extension formed at the rear end of said suspension assembly for enabling attachment to an actuator of a disk drive without a separate head arm to enable pivoting of said suspension assembly.]

[19. An assembly as in claim 1, including a damping material on said load beam.]

[20. An assembly as in claim 1, including at least one load/unload tab formed at the sides of said load beam section.]

[21. An assembly as in claim 2, wherein said top non-air bearing surface is substantially flat.]

[22. An assembly as in claim 21, wherein said lateral ear includes bent sections for contacting with said top surface of said slider.]

*23. Apparatus for supporting a slider comprising:*

*a single piece of elongated material of a first thickness, the single piece of elongated material having a distal end and a proximate end:*

*a shaped opening in the single piece of elongated material adjacent the distal end; the shaped opening defining;*

*a transverse section disposed at the distal end of the single piece of elongated material, the transverse section having a slider mounting surface;*

*first and second flexure beams connected to the transverse section, the first and second flexure beams having a second thickness that is less than the first thickness;*

*a tongue that extends between the first and second flexure beams, the tongue including a load point protrusion*

*that extends in a direction substantially normal to a bottom surface of the tongue.*

*24. The apparatus of claim 23, wherein the second thickness is approximately 0.0010 inches.*

*25. The apparatus of claim 23, wherein the transverse section, the first and second flexure beams, and the tongue lie in the same general plane.*

*26. The apparatus of claim 23, wherein the load point protrusion is disposed along a centerline extending between the first and second flexure beams.*

*27. The apparatus of claim 23, wherein the load point protrusion is offset a distance from a centerline extending between the first and second flexure beams.*

*28. The apparatus of claim 27, wherein the distance is greater than zero inches, but less than or equal to 0.006 inches.*

*29. Apparatus for supporting a slider comprising:*

*a single piece of elongated material of a first thickness, the single piece of elongated material having a distal end and a proximate end;*

*a shaped opening in the single piece of elongated material adjacent the distal end; the shaped opening defining:*

*a transverse section disposed at the distal end of the single piece of elongated material, the transverse section having a slider mounting surface;*

*first and second flexure beams connected to the transverse section;*

*a tongue that extends between the first and second flexure beams, the tongue including a load point protrusion that extends in a direction substantially normal to a bottom surface of the tongue; and*

*wherein the transverse section, the first and second flexure beams, and the tongue lie in the same general plane.*

*30. The apparatus of claim 29, wherein the first and second flexure beams have a second thickness that is less than the first thickness.*

*31. The apparatus of claim 30, wherein the second thickness is approximately 0.0010 inches.*

*32. The apparatus of claim 29, wherein the load point protrusion is disposed along a centerline extending between the first and second flexure beams.*

*33. The apparatus of claim 29, wherein the load point protrusion is offset a distance from a centerline extending between the first and second flexure beams.*

*34. The apparatus of claim 33, wherein the distance is greater than zero inches, but less than or equal to 0.006 inches.*

*35. The apparatus of claim 29, wherein the shaped opening is U-shaped.*

* * * * *